Patented Oct. 2, 1951

2,570,067

UNITED STATES PATENT OFFICE 2,570,067

HYDROCARBON CONVERSION WITH VANADIA- AND/OR MOLYBDENA-CONTAINING CATALYSTS

John W. Myers, Bartlesville, Okla., assignor to Phillips Petroleum Company, a corporation of Delaware No Drawing. Application June 16, 1947,
Serial No. 755,026

8 Claims. (Cl. 260—683.3)

This invention relates to catalytic conversion of hydrocarbon materials. In one embodiment it relates to a process for the catalytic dehydrogenation of hydrocarbons and to the regeneration of the catalyst used in such process. In another embodiment this invention relates to regeneration of spent catalyst ontaining oxides of vanadium and/or molybden .n. In one specific embodiment it relates to the regeneration of a spent dehydrogenation catalyst containing vanadia and/or molybdena.

In a process for the catalytic conversion of hydrocarbons, the hydrocarbon being converted is contacted with a suitable catalyst in a catalyst chamber at a temperature high enough to effect the desired reaction with a suitable time of contact. After such a process has been carried out for a time, the activity of the catalyst is reduced due to the deposition of carbonaceous material, commonly called coke or carbon, upon the surface of the catalyst. Such carbonaceous deposit can be removed by oxidation.

According to this invention, a molybdena- and/or vanadia-containing catalyst is charged to a catalyst chamber and the chamber heated to the reaction temperature, usually from 1050 to 1250° F., such temperature varying with contact time, pressure, the specific catalyst employed, hydrocarbon being converted, and other specific conditions. After being preheated in a furnace of suitable design, the hydrocarbon to be converted is passed into the catalyst chamber, either with or without use of steam dilution. The process is carried out with the product being removed from the reaction chamber to suitable fractionating means until such time as the catalyst is rendered inactive by the deposition of coke. Then, while in a reducing atmosphere such as that under which the process cycle is carried out, the chamber is cooled to temperatures of 700 to 1025° F., preferably from about 750 to about 950° F. At this lower temperature the regeneration is begun in an oxidizing atmosphere and continued for such a length of time as is necessary to remove the coke deposit and so regenerate the catalyst. After regeneration, the catalyst chamber is heated preferably in a reducing atmosphere, to process temperature and the process cycle resumed.

One object of this invention is to provide a method for the catalytic conversion of hydrocarbons.

Another object is to provide an improved process for the regeneration of a spent catalyst containing vanadia and/or molybdena.

Still another object is to provide an improved method for the regeneration of a vanadia- and/or molybdena-containing metal oxide catalyst used in a process for the catalytic conversion of hydrocarbons at elevated temperature.

One specific object of this invention is to provide an improved method for the regeneration of a vanadia- and/or molybdena-containing catalyst used for the dehydrogenation of low-boiling hydrocarbons.

Other objects and advantages will be apparent to those skilled in the art from the accompanying disclosure and discussion.

I have discovered that when a catalyst containing molybdenum and/or vanadium oxides is heated above about 1025° F. in an oxidizing atmosphere, considerable loss of the catalyst due to sublimation or volatilization occurs, whereas no appreciable loss occurs when such catalysts are heated to temperatures above about 1025° F. when said catalysts are maintained in a reducing atmosphere. Also, I have found that substantially no loss by volatilization from a vanadia or molybdena-containing catalyst occurs when the regeneration of this catalyst is carried out within the temperature range of 700 to 1025° F. whereas appreciable amounts of these components are lost from such catalysts when regenerated at temperatures above about 1025° F.

In one specific embodiment, n-butane is dehydrogenated either with or without diluent steam at a temperature of 1100° F. to 1250° F. over a catalyst containing vanadia and/or molybdena. After coke deposition is sufficient to reduce catalyst activity to a level such that reactivation is desirable, the catalyst and chamber are cooled in a reducing atmosphere, which may be the C₃ and/or lighter material separated from the effluent of the processing cycle or similar relatively difficultly-converted light hydrocarbon material, or free hydrogen. When cooled to between about 700 and about 1025° F., or preferably 750° to 950° F., the catalyst chamber is purged with steam and the catalyst regenerated in an oxidizing atmosphere, which may be air diluted with steam or recycle regeneration gas. Care is exercised to prevent the temperature in the catalyst bed from rising above the limit previously designated in order to prevent volatilization of the vanadia and/or molybdena from the catalyst. When regeneration is complete, the catalyst and chamber are purged with steam, filled with a reducing atmosphere, and then heated in said reducing atmosphere, which may be the same type as that used in the cooling step. When the catalyst and chamber are heated to the desired reaction temperature, the process cycle is resumed by discontinuing the flow of C₃ and/or lighter gases or the like which provide the reducing atmosphere and resuming the flow of n-butane heated to the desired conversion temperature. By operating in this or similar manner, vaporization of the vanadia and/or molybdena is prevented, thereby avoiding difficulties which would be caused by alteration in the composition of the catalyst as by deposition of solid vanadia and/or molybdena in cooler zones of the plant.

This invention may be applied to the regeneration, within the given temperature limits, of a catalyst deactivated by such a coke or carbonaceous deposit used in any analogous process where such a molybdena- and/or vanadia-containing catalyst is used to bring about the reaction, such as catalytic reforming, etc., and therefore should not be limited to the regeneration of such a catalyst used in a process of dehydrogenation.

Example I

Six runs were made in which normal butane diluted with steam was dehydrogenated over catalysts having the composition (weight per cent) and under the conditions shown in the following table. After a certain reaction time, carbon deposited on the catalysts decreased their activity. The dehydrogenation was then interrupted and the deposited carbon was burned off by means of a gas stream containing air.

| Run | Catalyst | Dehydrogenation Temp. | Regeneration Temp. | N-C₄H₁₀ Space Velocity, vol./vol./hr. (STP) | Steam, HC (vol.) | Length of Regeneration Period (Hr.) |
|---|---|---|---|---|---|---|
| 1 | 10Cr₂O₃–29V₂O₅–61Al₂O₃ | 1,203 | 1,104 | 600 | 10.2 | 2.0 |
| 2 | do | 1,198 | 1,000 | 600 | 10.2 | 0.8 |
| 3 | do | 1,191 | 966 | 600 | 10.2 | 1.0 |
| 4 | do | 1,191 | 854 | 600 | 10.2 | 2.3 |
| 5 | do | 1,196 | 761 | 600 | 10.2 | 1.6 |
| 6 | do | 1,163 | 795 | 640 | 9.7 | 10.6 |

At the end of the regeneration period in run No. 1 a yellow solid deposit was noticed at the outlet of the catalyst tube. This yellow solid was vanadia which had been volatilized from the catalyst during the regeneration period.

Run No. 2 was conducted under the conditions indicated. This run was conducted by substantially the same procedure as that used in run No. 1, the chief difference being a lower regeneration temperature. At the end of the regeneration period in run No. 2 a very small amount of a yellow deposit (much less than that obtained in run No. 1) was detected at the outlet of the catalyst tube.

Runs 3, 4, 5 and 6 were conducted by substantially the same procedure as that used in runs 1 and 2 but using still lower regeneration temperatures as shown. Runs 3–6 showed no coloration at the outlet of the catalyst tube and therefore no appreciable catalyst loss. Run No. 6 with a regeneration period of 10.6 hours shows that there is no catalyst loss in the low temperature regeneration range even during extended periods of time.

Example II

Butane diluted with steam was dehydrogenated in the presence of a catalyst comprising 10 parts by weight chromia, 30 parts vanadia, and 60 parts alumina. After sufficient carbon had been deposited on the catalyst to impair the activity appreciably, an attempt was made to regenerate the catalyst by contacting it with an air-steam mixture at 1250° F. This procedure, instead of restoring the activity, actually decreased it further. This decrease was found to be accompanied by vaporization of part of the vanadia from the catalyst.

The catalyst was then further treated at 1250° F. with a stream of substantially pure air. The activity was further decreased as a result of vaporization of vanadia from the catalyst in the oxidizing atmosphere.

Example III

When an alumina- and molybdena-containing catalyst that has been spent in butane dehydrogenation is regenerated at a temperature of 1200° F. by oxidation of the coke deposit by air diluted with steam, appreciable amounts of solid material precipitate in the cooler portion of the apparatus downstream from the catalyst chamber. When this catalyst, partially deactivated by coke, is cooled to 900° F. in a reducing atmosphere and regenerated by passing an oxygen-containing gas over the catalyst, while maintaining the temperature of the catalyst at 900° F., no solid deposit is found downstream from the catalyst chamber.

It is to be understood that this invention should not be unnecessarily limited to the above discussion and description and that modifications and variations may be made without departing from the invention or from the scope of the claims.

I claim:

1. A process for the catalytic conversion of hydrocarbon material, which comprises passing said hydrocarbon material over a catalyst containing an oxide of a metal selected from the group consisting of vanadium and molybdenum maintained at a temperature in the range of about 1050 to about 1250° F. until the catalyst is deactivated by deposition of carbonaceous material on the surface thereof; discontinuing passing said hydrocarbon material over said catalyst, maintaining a reducing atmosphere in contact with said catalyst while lowering the temperature to a range of 700 to 1025° F.; then burning off said carbonaceous material with an oxygen-containing gas while maintaining the temperature of said catalyst in said last-named range; reheating the reactivated catalyst in a reducing atmosphere to a temperature in the range of about 1050 to about 1250° F. and resuming said catalytic conversion process.

2. A process for the catalytic dehydrogenation of hydrocarbons, which comprises passing hydrocarbons over a catalyst containing an oxide of a metal selected from the group consisting of vanadium and molybdenum maintained at a temperature in the range of about 1050 to about 1250° F. until the catalyst is deactivated by deposition of carbonaceous material on the surface thereof; discontinuing passing said hydrocarbons over said catalyst, maintaining a reducing atmosphere in contact with said catalyst while lowering the temperature to a range of 700 to 1025° F.; then burning off said carbonaceous material with an oxygen-containing gas while maintaining the temperature of said catalyst in said last-named range; reheating the reactivated catalyst in a reducing atmosphere to a temperature in the range of about 1050 to about 1250° F. and resuming said catalytic dehydrogenation process.

3. A process for the catalytic dehydrogenation of normal butane, which comprises passing normal butane material over a catalyst containing an oxide of a metal selected from the group consisting of vanadium and molybdenum maintained at a temperature in the range of about 1100 to about 1250° F. until the catalyst is deactivated by deposition of carbonaceous material on the surface thereof; discontinuing passing said normal butane over said catalyst, maintaining a reducing atmosphere in contact with said catalyst while lowering the temperature to a range of 700 to 1025° F.; then burning off said carbonaceous material with an oxygen-containing gas while maintaining the temperature of said catalyst in said last-named range; replacing the regeneration gases with a reducing atmosphere while the reactivated catalyst is below 1025° F.; reheating said reactivated catalyst in said reducing atmosphere to a temperature in the range of about 1100 to about 1250° F. and resuming said normal butane dehydrogenation process.

4. A method of regenerating a deactivated catalyst containing an oxide of a metal selected from the group consisting of vanadium and molybdenum used in a hydrocarbon conversion process without losing any substantial part of said oxide due to volatilization, which process is operated at a temperature in the range of 1050–1250° F. wherein the catalyst becomes deactivated by deposition of carbonaceous material on the surface thereof, which comprises discontinuing passing a hydrocarbon feed over said catalyst when it becomes deactivated; cooling the deactivated catalyst to a temperature in the range of 700–1025° F. in a reducing atmosphere; purging said deactivated catalyst at a temperature in said last-named range with an inert gaseous material; burning off said carbonaceous material with an oxygen-containing gas while maintaining the temperature of said catalyst in said last-named range; purging the resulting reactivated catalyst with an inert gaseous material; reheating the purged reactivated catalyst in a reducing atmosphere to a temperature in the range of 1050–1250° F.; and resuming the hydrocarbon conversion process.

5. A method of regenerating a deactivated catalyst containing an oxide of a metal selected from the group consisting of vanadium and molybdenum used in a process for the dehydrogenation of hydrocarbon without losing any substantial part of said oxide due to volatilization, which process is operated at a temperature in the range of 1050–1250° F. wherein the catalyst becomes deactivated by deposition of carbonaceous material on the surface thereof, which comprises discontinuing passing a hydrocarbon feed over said catalyst when it becomes deactivated; cooling the deactivated catalyst to a temperature in the range of 700–1025° F. in a reducing atmosphere; purging said deactivated catalyst at said lower temperature with an inert gaseous material; burning off said carbonaceous material with an oxygen-containing gas while maintaining the temperature of said catalyst in said last-named range; purging the resulting reactivated catalyst with an inert gaseous material; reheating the purged reactivated catalyst in a reducing atmosphere to a temperature in the range of 1050–1250° F.; and resuming the hydrocarbon dehydrogenation process.

6. A method of regenerating a deactivated catalyst consisting essentially of oxides of chromium, aluminum, and vanadium used in in a process for the dehydrogenation of butane without losing any substantial part of the vanadium oxide due to volatilization, which process is operated at a temperature in the range of 1050–1250° F. wherein the catalyst becomes deactivated by deposition of carbonaceous material on the surface thereof, which comprises discontinuing passing butane over said catalyst when it becomes deactivated; cooling the deactivated catalyst to a temperature in the range of 750–950° F. in an atmosphere of at least a portion of the $C_3$-and-lighter material contained in the effluent from the dehydrogenation process; purging said deactivated catalyst at said lower temperature with steam; burning off said carbonaceous material with an oxygen-containing gas while maintaining the temperature of said catalyst in said last-named range; purging the resulting reactivated catalyst with steam; reheating the purged reactivated catalyst in an atmosphere comprising at least a portion of the $C_3$-and-lighter material contained in the effluent from the dehydrogenation process to a temperature in the range of 1050–1250° F.; and resuming the butane dehydrogenation process.

7. The process of claim 1 in which the catalyst temperature between the cooling and reheating steps is maintained in the range of 750 to 950° F.

8. The process of claim 4 in which the catalyst temperature between the cooling and reheating steps is maintained in the range of 750 to 950° F.

JOHN W. MYERS.

REFERENCES CITED

The following references are of record in the file of this patent:

UNITED STATES PATENTS

| Number | Name | Date |
| --- | --- | --- |
| 2,304,183 | Layng et al. | Dec. 8, 1942 |
| 2,311,273 | Watson | Feb. 16, 1943 |
| 2,338,881 | Thomas | Jan. 11, 1944 |
| 2,356,697 | Rial | Aug. 22, 1944 |
| 2,357,365 | Van Horn et al. | Sept. 5, 1944 |
| 2,397,352 | Hemminger | Mar. 26, 1946 |
| 2,403,052 | Cole et al. | July 2, 1946 |
| 2,414,585 | Eggertsen et al. | Jan. 21, 1947 |
| 2,423,835 | Houdry | July 15, 1947 |